(12) United States Patent
Wall et al.

(10) Patent No.: US 7,876,998 B2
(45) Date of Patent: Jan. 25, 2011

(54) DVD PLAYBACK OVER MULTI-ROOM BY COPYING TO HDD

(76) Inventors: William E. Wall, 1048 Oakdale Rd., Atlanta, GA (US) 30307; Samuel H. Russ, 1450 Turtle Dove La., Lawrenceville, GA (US) 30043

( * ) Notice: Subject to any disclaimer, the term of this patent is extended or adjusted under 35 U.S.C. 154(b) by 912 days.

(21) Appl. No.: 11/163,107

(22) Filed: Oct. 5, 2005

(65) Prior Publication Data

US 2007/0077038 A1   Apr. 5, 2007

(51) Int. Cl.
*H04N 5/91* (2006.01)
*H04N 5/00* (2006.01)

(52) U.S. Cl. .......................... 386/83; 386/125
(58) Field of Classification Search .................. 386/83, 386/46, 125, 124, 45, 52
See application file for complete search history.

(56) References Cited

U.S. PATENT DOCUMENTS

| | | | |
|---|---|---|---|
| 4,215,366 A | 7/1980 | Davidson | 380/235 |
| 4,290,081 A | 9/1981 | Foerster | 358/4 |
| 4,439,784 A | 3/1984 | Furukawa et al. | 725/25 |
| 4,535,355 A | 8/1985 | Arn et al. | 380/212 |
| 4,540,958 A | 9/1985 | Neyens et al. | 332/16 |
| 4,578,533 A | 3/1986 | Pierce | 379/93.31 |
| 4,644,526 A | 2/1987 | Wu | 370/295 |
| 4,686,564 A | 8/1987 | Masuko et al. | 725/120 |
| 4,706,121 A | 11/1987 | Young | 348/27 |
| 4,751,578 A | 6/1988 | Reiter et al. | 348/564 |
| 4,885,803 A | 12/1989 | Hermann et al. | 398/112 |
| 4,908,713 A | 3/1990 | Levine | 386/83 |
| 4,916,532 A | 4/1990 | Streck et al. | 348/723 |
| 4,963,994 A | 10/1990 | Levine | 386/83 |
| 4,963,995 A | 10/1990 | Lang | 386/54 |
| 5,010,299 A | 4/1991 | Nishizawa et al. | 324/209 |
| 5,010,399 A | 4/1991 | Goodman et al. | 358/85 |
| 5,038,211 A | 8/1991 | Hallenbeck | 348/460 |
| 5,048,054 A | 9/1991 | Eyuboglu et al. | 375/222 |
| 5,155,591 A | 10/1992 | Wachob | 725/35 |
| 5,168,372 A | 12/1992 | Sweetser | 725/29 |
| 5,251,074 A | 10/1993 | Hamma et al. | 360/10.1 |
| 5,253,066 A | 10/1993 | Vogel | 725/28 |
| 5,293,357 A | 3/1994 | Hallenbeck | 725/39 |

(Continued)

FOREIGN PATENT DOCUMENTS

EP   0 912 054   4/1999

(Continued)

OTHER PUBLICATIONS

Alexis De Lattre et al; Vidolan Streaming [online] Feb. 12, 2005, pp. 1-14.

(Continued)

*Primary Examiner*—Robert Chevalier
(74) *Attorney, Agent, or Firm*—Merchant & Gould

(57) ABSTRACT

DVD playback over Multi-room by copying to the hard drive of a primary device in a networked multi-room system (NMS). The DVD content is saved to a hard drive and can then be retrieved by any of the remote devices in the NMS by accessing the program guide or the recorded programs list. The DVD menu can be altered to include previews, contests, products, etc.

24 Claims, 5 Drawing Sheets

U.S. PATENT DOCUMENTS

| | | | |
|---|---|---|---|
| 5,381,449 A | 1/1995 | Jasper et al. ................ 375/298 |
| 5,406,626 A | 4/1995 | Ryan ............................. 380/9 |
| 5,412,416 A | 5/1995 | Nemirofsky ................. 725/36 |
| 5,479,268 A | 12/1995 | Young et al. .................. 386/83 |
| 5,481,542 A | 1/1996 | Logston et al. ............. 725/131 |
| 5,508,815 A | 4/1996 | Levine ......................... 386/83 |
| 5,515,377 A | 5/1996 | Horne et al. ........... 370/395.64 |
| 5,524,051 A | 6/1996 | Ryan ............................. 380/9 |
| 5,553,211 A | 9/1996 | Uotani |
| 5,568,272 A | 10/1996 | Levine ......................... 386/48 |
| 5,574,964 A | 11/1996 | Hamlin ....................... 455/3.1 |
| 5,579,308 A | 11/1996 | Humpleman ............... 370/58.1 |
| 5,590,195 A | 12/1996 | Ryan ............................. 380/9 |
| 5,600,364 A | 2/1997 | Hendricks et al. .............. 725/9 |
| 5,600,573 A | 2/1997 | Hendricks et al. ........... 725/109 |
| 5,600,707 A | 2/1997 | Miller, II .................... 370/281 |
| 5,621,793 A | 4/1997 | Bednarek et al. ............ 380/240 |
| 5,636,247 A | 6/1997 | Kamerman et al. ......... 375/260 |
| 5,638,423 A | 6/1997 | Grube et al. ................. 455/411 |
| 5,642,384 A | 6/1997 | Ramesh ...................... 375/265 |
| 5,652,772 A | 7/1997 | Isaksson et al. ............. 375/367 |
| 5,657,072 A | 8/1997 | Aristides et al. |
| 5,666,151 A | 9/1997 | Kondo et al. ................ 725/147 |
| 5,682,206 A | 10/1997 | Wehmeyer et al. .......... 348/563 |
| 5,699,105 A | 12/1997 | Chen et al. ................... 725/120 |
| 5,701,383 A | 12/1997 | Russo et al. .................. 386/46 |
| 5,708,961 A | 1/1998 | Hylton et al. ................ 455/4.2 |
| 5,714,945 A | 2/1998 | Sakuma et al. ........... 340/10.31 |
| 5,715,020 A | 2/1998 | Kuroiwa et al. ............. 348/734 |
| 5,715,277 A | 2/1998 | Goodson et al. ............. 375/222 |
| 5,732,359 A | 3/1998 | Baranowsky, II et al.   455/552.1 |
| 5,734,437 A | 3/1998 | Back |
| 5,751,806 A | 5/1998 | Ryan ........................... 380/9 |
| 5,758,257 A | 5/1998 | Herz et al. ...................... 455/2 |
| 5,760,822 A | 6/1998 | Coutinho |
| 5,774,527 A | 6/1998 | Handelman et al. ...... 379/93.07 |
| 5,778,181 A | 7/1998 | Hidary et al. |
| 5,787,472 A | 7/1998 | Dan et al. .................... 711/134 |
| 5,793,413 A | 8/1998 | Hylton et al. ................. 348/12 |
| 5,793,414 A | 8/1998 | Shaffer ....................... 725/133 |
| 5,796,442 A | 8/1998 | Gove et al. .................. 348/556 |
| 5,801,787 A | 9/1998 | Schein et al. |
| 5,805,763 A | 9/1998 | Lawler et al. |
| 5,808,659 A | 9/1998 | Coutinho et al. .................. 48/7 |
| 5,809,204 A | 9/1998 | Young et al. .................. 386/83 |
| 5,815,794 A | 9/1998 | Williams |
| 5,828,403 A | 10/1998 | DeRodeff et al. ........... 725/131 |
| 5,835,128 A | 11/1998 | MacDonald et al. ......... 725/81 |
| 5,835,602 A | 11/1998 | Lang .......................... 380/268 |
| 5,838,873 A | 11/1998 | Blatter et al. ................. 386/95 |
| 5,850,218 A | 12/1998 | LaJoie et al. |
| 5,850,340 A | 12/1998 | York .......................... 700/83 |
| 5,851,149 A | 12/1998 | Xidos et al. .................. 463/42 |
| 5,867,485 A | 2/1999 | Chambers et al. ........... 370/281 |
| 5,872,644 A | 2/1999 | Yamazaki et al. ............. 398/63 |
| 5,883,677 A | 3/1999 | Hofmann .................... 348/584 |
| 5,886,732 A | 3/1999 | Humpleman ................. 725/69 |
| 5,886,753 A | 3/1999 | Shinyagaito et al. .......... 725/59 |
| 5,915,068 A | 6/1999 | Levine ......................... 386/83 |
| 5,920,801 A | 7/1999 | Thomas et al. ................ 725/82 |
| 5,930,247 A | 7/1999 | Miller, II et al. ............. 370/338 |
| 5,936,660 A | 8/1999 | Gurantz ....................... 725/71 |
| 5,940,073 A | 8/1999 | Klosterman et al. ......... 715/721 |
| 5,940,387 A | 8/1999 | Humpleman ................ 370/352 |
| 5,970,053 A | 10/1999 | Schick et al. ................. 370/252 |
| 5,970,386 A | 10/1999 | Williams ...................... 725/69 |
| 5,983,068 A | 11/1999 | Tomich et al. ................ 725/32 |
| 5,990,927 A | 11/1999 | Hendricks et al. ........... 725/132 |
| 5,995,258 A | 11/1999 | Weber et al. ................. 398/125 |
| 5,999,622 A | 12/1999 | Yasukawa et al. ............. 705/51 |
| 6,005,861 A | 12/1999 | Humpleman ................ 370/352 |
| 6,005,876 A | 12/1999 | Cimini, Jr. et al. .......... 370/525 |
| 6,006,257 A | 12/1999 | Slezak |
| 6,014,546 A | 1/2000 | Georges et al. ................ 725/79 |
| 6,018,768 A | 1/2000 | Ullman et al. |
| 6,023,603 A | 2/2000 | Matsubara ................... 455/3.2 |
| 6,026,150 A | 2/2000 | Frank et al. ............... 379/90.01 |
| 6,037,998 A | 3/2000 | Usui et al. ................... 348/569 |
| 6,052,556 A | 4/2000 | Sampsell |
| 6,055,355 A | 4/2000 | Lee ............................. 386/70 |
| 6,061,449 A | 5/2000 | Candelore et al. ............. 380/28 |
| 6,069,621 A | 5/2000 | Schupak .................... 715/717 |
| 6,073,122 A | 6/2000 | Wool ........................... 705/51 |
| 6,091,320 A | 7/2000 | Odinak .................... 340/310.01 |
| 6,091,767 A | 7/2000 | Westerman ................. 375/240 |
| 6,100,883 A | 8/2000 | Hoarty |
| 6,100,936 A | 8/2000 | Jordan et al. ................ 348/552 |
| 6,115,456 A | 9/2000 | Nolde ..................... 379/102.01 |
| 6,118,873 A | 9/2000 | Lotspiech et al. ............ 380/277 |
| 6,119,154 A | 9/2000 | Weaver et al. .............. 709/219 |
| 6,122,482 A | 9/2000 | Green, Sr. et al. ........... 455/3.2 |
| 6,125,103 A | 9/2000 | Bauml et al. ................ 370/203 |
| 6,133,912 A | 10/2000 | Montero ..................... 715/716 |
| 6,151,493 A | 11/2000 | Sasakura et al. ............. 455/421 |
| 6,166,744 A | 12/2000 | Jaszlics et al. |
| 6,169,543 B1 | 1/2001 | Wehmeyer ................... 345/327 |
| 6,172,712 B1 | 1/2001 | Beard ......................... 348/552 |
| 6,175,343 B1 | 1/2001 | Mitchell et al. |
| 6,175,551 B1 | 1/2001 | Awater et al. ................ 370/210 |
| 6,177,931 B1 | 1/2001 | Alexander et al. |
| 6,177,963 B1 | 1/2001 | Foye et al. |
| 6,181,784 B1 | 1/2001 | Duran et al. ............. 379/93.21 |
| 6,182,287 B1 | 1/2001 | Schneidewend et al. ....... 725/48 |
| 6,188,700 B1 | 2/2001 | Kato et al. ................... 370/477 |
| 6,202,211 B1 | 3/2001 | Williams, Jr. |
| 6,208,669 B1 | 3/2001 | Cimini, Jr. et al. .......... 370/525 |
| 6,215,526 B1 | 4/2001 | Barton et al. ................ 348/473 |
| 6,219,839 B1 | 4/2001 | Sampsell ..................... 725/40 |
| 6,229,895 B1 | 5/2001 | Son et al. .................... 380/200 |
| 6,230,162 B1 | 5/2001 | Kumar et al. ............. 707/104.1 |
| 6,233,389 B1 | 5/2001 | Barton et al. ................. 386/46 |
| 6,236,653 B1 | 5/2001 | Dalton et al. |
| 6,240,555 B1 | 5/2001 | Daniel et al. ................ 725/110 |
| 6,243,142 B1 | 6/2001 | Mugura et al. .............. 348/564 |
| 6,263,503 B1 | 7/2001 | Margulis ..................... 725/81 |
| 6,285,746 B1 | 9/2001 | Duran et al. ............. 379/93.21 |
| 6,286,140 B1 | 9/2001 | Ivanyi ......................... 725/14 |
| 6,286,142 B1 | 9/2001 | Ehreth ......................... 725/78 |
| 6,305,017 B1 | 10/2001 | Satterfield .................... 725/44 |
| 6,310,886 B1 | 10/2001 | Barton ........................ 370/462 |
| 6,314,146 B1 | 11/2001 | Tellado et al. ............... 375/346 |
| 6,317,884 B1 | 11/2001 | Eames et al. .................. 725/78 |
| 6,324,338 B1 | 11/2001 | Wood et al. ................... 386/83 |
| 6,327,418 B1 | 12/2001 | Barton ........................ 386/43 |
| 6,330,334 B1 | 12/2001 | Ryan .......................... 380/237 |
| 6,333,937 B1 | 12/2001 | Ryan .......................... 370/468 |
| 6,353,929 B1 | 3/2002 | Houston ....................... 725/20 |
| 6,356,309 B1 | 3/2002 | Masaki et al. ............. 348/439.1 |
| 6,377,782 B1 | 4/2002 | Bishop et al. ............... 455/3.01 |
| 6,378,130 B1 | 4/2002 | Adams ........................ 725/95 |
| 6,411,820 B1 | 6/2002 | Margarit et al. |
| 6,415,031 B1 | 7/2002 | Colligan et al. ............. 380/200 |
| 6,418,558 B1 | 7/2002 | Roberts et al. .............. 725/129 |
| 6,421,706 B1 | 7/2002 | McNeill et al. ............. 709/204 |
| 6,424,947 B1 | 7/2002 | Tsuria et al. ................... 705/1 |
| 6,438,165 B2 | 8/2002 | Normile ..................... 375/240 |
| 6,441,832 B1 | 8/2002 | Tao et al. |
| 6,442,755 B1 | 8/2002 | Lemmons et al. ............. 725/47 |
| 6,452,923 B1 | 9/2002 | Gerszberg et al. ........... 370/352 |
| 6,459,427 B1 | 10/2002 | Mao et al. ................... 725/109 |
| 6,473,559 B1 | 10/2002 | Knudson et al. |
| 6,481,013 B1 | 11/2002 | Dinwiddie et al. ............ 725/80 |
| 6,483,548 B1 | 11/2002 | Allport ....................... 348/564 |
| 6,493,875 B1 | 12/2002 | Eames et al. .................. 725/81 |

| | | | | | |
|---|---|---|---|---|---|
| 6,496,980 B1 | 12/2002 | Tillman et al. ............... 725/90 | 7,146,628 B1 | 12/2006 | Gordon et al. ............... 725/54 |
| 6,505,348 B1 | 1/2003 | Knowles et al. ............... 725/49 | 7,155,012 B2 | 12/2006 | Candelore et al. ........... 380/42 |
| 6,516,029 B1 | 2/2003 | Wang | 7,184,550 B2 | 2/2007 | Graunke ...................... 380/42 |
| 6,526,581 B1 | 2/2003 | Edson .......................... 725/74 | 7,185,355 B1 | 2/2007 | Ellis et al. .................... 725/46 |
| 6,530,085 B1 | 3/2003 | Perlman ...................... 725/82 | 7,190,901 B2 | 3/2007 | Farmer et al. ................ 398/67 |
| 6,535,717 B1 | 3/2003 | Matsushima et al. .......... 455/18 | 7,209,667 B2 | 4/2007 | Lindblad ..................... 398/164 |
| 6,536,041 B1 | 3/2003 | Knudson et al. ............... 725/39 | 7,218,738 B2 | 5/2007 | Pedlow et al. ............... 380/218 |
| 6,542,610 B2 | 4/2003 | Traw et al. ................... 380/262 | 7,222,358 B2 | 5/2007 | Levinson et al. ............. 725/121 |
| 6,556,557 B1 | 4/2003 | Cimini, Jr. et al. ........... 370/342 | 7,231,516 B1 | 6/2007 | Sparrell et al. ............... 713/156 |
| 6,567,981 B1 | 5/2003 | Jeffrey ........................ 725/80 | 7,233,669 B2 | 6/2007 | Candelore ..................... 380/210 |
| 6,578,070 B1 | 6/2003 | Weaver et al. ................ 709/206 | 7,234,155 B1 | 6/2007 | Kay et al. ..................... 725/60 |
| 6,588,017 B1 | 7/2003 | Calderone ................... 725/120 | 7,260,829 B1 | 8/2007 | Hendricks et al. ........... 725/152 |
| 6,594,798 B1 | 7/2003 | Chou et al. ................... 714/820 | 7,278,154 B2 | 10/2007 | Harrison et al. |
| 6,614,936 B1 | 9/2003 | Wu et al. ..................... 382/238 | 7,305,700 B2 | 12/2007 | Boynton et al. ............... 726/4 |
| 6,622,304 B1 | 9/2003 | Carhart ....................... 725/74 | 7,310,355 B1 | 12/2007 | Krein et al. .................. 370/492 |
| 6,622,307 B1 | 9/2003 | Ho ............................... 725/100 | 7,313,811 B1 | 12/2007 | Sheppard et al. |
| 6,631,522 B1 | 10/2003 | Erdelyi ........................ 725/53 | 7,336,787 B2 | 2/2008 | Unger et al. ................. 380/217 |
| 6,637,031 B1 | 10/2003 | Chou ........................... 725/87 | 7,346,120 B2 | 3/2008 | McCorkle .................... 375/295 |
| 6,675,385 B1 | 1/2004 | Wang ........................... 725/39 | 7,346,134 B2 | 3/2008 | Smith .......................... 375/346 |
| 6,681,326 B2 | 1/2004 | Son et al. ..................... 713/150 | 7,346,233 B2 | 3/2008 | McCorkle .................... 375/295 |
| 6,697,426 B1 | 2/2004 | Van Der Schaar et al. ........................ 375/240.01 | 7,350,225 B2 | 3/2008 | Ovadia |
| | | | 7,360,233 B2 | 4/2008 | Russ et al. ................... 725/118 |
| 6,697,489 B1 | 2/2004 | Candelore ..................... 380/200 | 7,360,235 B2 | 4/2008 | Davies et al. ............... 725/133 |
| 6,704,028 B2 | 3/2004 | Wugofski .................... 715/719 | 7,366,914 B2 | 4/2008 | Graunke ...................... 713/190 |
| 6,711,132 B2 | 3/2004 | Lazarus ....................... 370/236 | 7,392,389 B2 | 6/2008 | Kori ............................ 713/170 |
| 6,735,221 B1 | 5/2004 | Cherubini .................... 370/485 | 7,434,246 B2 | 10/2008 | Florence ...................... 725/46 |
| 6,735,312 B1 | 5/2004 | Abdalla et al. ............... 380/239 | 7,487,532 B2 | 2/2009 | Robertson et al. ........... 725/111 |
| 6,754,905 B2 | 6/2004 | Gordon et al. | 7,516,470 B2 | 4/2009 | Russ et al. ................... 725/48 |
| 6,757,906 B1 | 6/2004 | Look et al. ................... 725/45 | 7,545,935 B2 | 6/2009 | Claussen ..................... 380/200 |
| 6,766,526 B1 | 7/2004 | Ellis ............................ 725/57 | 7,574,723 B2 | 8/2009 | Putterman et al. |
| 6,769,127 B1 | 7/2004 | Bonomi et al. ............... 725/39 | 7,603,684 B1 | 10/2009 | Ellis ............................ 725/39 |
| 6,771,908 B2 | 8/2004 | Eijk et al. .................... 398/66 | 2001/0005906 A1 | 6/2001 | Humpleman ................ 725/82 |
| 6,785,258 B1 | 8/2004 | Garcia, Jr. et al. .......... 370/344 | 2001/0011373 A1 | 8/2001 | Inoue .......................... 725/50 |
| 6,785,901 B1 | 8/2004 | Horiwitz et al. ............. 725/25 | 2001/0017920 A1 | 8/2001 | Son et al. ..................... 380/212 |
| 6,788,740 B1 | 9/2004 | van der Schaar et al. .... 375/240 | 2001/0030664 A1 | 10/2001 | Shulman et al. ............. 345/835 |
| 6,789,106 B2 | 9/2004 | Eyer et al. .................... 709/205 | 2001/0039660 A1 | 11/2001 | Vasilevsky et al. ........... 725/78 |
| 6,791,995 B1 | 9/2004 | Azenkot et al. ............... 380/239 | 2002/0002707 A1 | 1/2002 | Ekel et al. .................... 725/87 |
| 6,795,205 B1 | 9/2004 | Gacek ......................... 358/1.15 | 2002/0007485 A1 | 1/2002 | Rodriguez et al. ............. 725/1 |
| 6,798,838 B1 | 9/2004 | Ngo ........................... 375/240.19 | 2002/0007493 A1 | 1/2002 | Butler et al. |
| 6,804,357 B1 | 10/2004 | Ikonen et al. ............... 380/241 | 2002/0010936 A1 | 1/2002 | Adam .......................... 725/91 |
| 6,816,194 B2 | 11/2004 | Zhang et al. ............. 375/240.27 | 2002/0019984 A1 | 2/2002 | Rakib .......................... 725/111 |
| 6,816,904 B1 | 11/2004 | Ludwig et al. ............... 709/226 | 2002/0035726 A1 | 3/2002 | Corl ............................ 725/39 |
| 6,845,486 B2 | 1/2005 | Yamada et al. | 2002/0035729 A1 | 3/2002 | Diep ............................ 725/78 |
| 6,864,778 B2 | 3/2005 | Musschebroeck et al. .. 340/3.41 | 2002/0040475 A1 | 4/2002 | Yap et al. ..................... 725/39 |
| 6,868,292 B2 | 3/2005 | Ficco et al. ................... 700/19 | 2002/0044762 A1 | 4/2002 | Wood et al. |
| 6,870,570 B1 | 3/2005 | Bowser ....................... 348/552 | 2002/0051200 A1 | 5/2002 | Chang et al. ................ 358/1.15 |
| 6,889,385 B1 | 5/2005 | Rakib et al. .................. 725/119 | 2002/0051581 A1 | 5/2002 | Takeuchi et al. ............. 382/240 |
| 6,904,522 B1 | 6/2005 | Benardeau et al. .......... 713/194 | 2002/0056112 A1 | 5/2002 | Dureau et al. ................ 725/78 |
| 6,915,529 B1 | 7/2005 | Suematsu et al. ............. 725/78 | 2002/0059615 A1 | 5/2002 | Okawara et al. ............. 725/80 |
| 6,922,843 B1 | 7/2005 | Herrington et al. ............. 725/30 | 2002/0059617 A1 | 5/2002 | Terakado et al. ............. 725/80 |
| 6,930,788 B1 | 8/2005 | Iwamoto et al. ............. 358/1.15 | 2002/0059623 A1 | 5/2002 | Rodriguez et al. ........... 725/91 |
| 6,941,515 B1 | 9/2005 | Wilkins | 2002/0059637 A1 | 5/2002 | Rakib .......................... 725/119 |
| 6,950,517 B2 | 9/2005 | Hawkes et al. ............... 725/87 | 2002/0059642 A1 | 5/2002 | Russ et al. ................... 725/135 |
| 6,954,897 B1 | 10/2005 | Noguchi et al. | 2002/0066101 A1 | 5/2002 | Gordon et al. ............... 725/43 |
| 6,957,344 B1 | 10/2005 | Goldshlag et al. ........... 713/194 | 2002/0067437 A1 | 6/2002 | Tsubouchi et al. .......... 348/725 |
| 6,978,474 B1 | 12/2005 | Sheppard et al. ............. 725/83 | 2002/0069417 A1 | 6/2002 | Kliger et al. ................. 725/78 |
| 6,996,623 B1 | 2/2006 | Kawano et al. | 2002/0083438 A1 | 6/2002 | So et al. ...................... 725/31 |
| 6,996,837 B1 | 2/2006 | Miura et al. ................... 725/78 | 2002/0087996 A1 | 7/2002 | Bi et al. ....................... 725/89 |
| 7,020,890 B1 | 3/2006 | Suematsu et al. ............. 725/78 | 2002/0090198 A1 | 7/2002 | Rosenberg et al. ........... 386/52 |
| 7,020,892 B2 | 3/2006 | Levesque et al. ............. 725/89 | 2002/0095673 A1 | 7/2002 | Leung et al. ................. 725/25 |
| 7,039,169 B2 | 5/2006 | Jones ......................... 379/93.02 | 2002/0095689 A1 | 7/2002 | Novak ......................... 725/151 |
| 7,039,245 B1 | 5/2006 | Hamery | 2002/0100041 A1 | 7/2002 | Rosenberg et al. ........... 725/32 |
| 7,042,526 B1 | 5/2006 | Borseth | 2002/0104001 A1 | 8/2002 | Lotspiech et al. ........... 713/163 |
| 7,047,305 B1 | 5/2006 | Brooks et al. ............... 709/231 | 2002/0108109 A1 | 8/2002 | Harris et al. ................. 725/32 |
| 7,054,289 B1 | 5/2006 | Foster et al. ................. 370/330 | 2002/0108121 A1 | 8/2002 | Alao et al. ................... 725/110 |
| 7,065,781 B1 | 6/2006 | Entwistle .................... 725/135 | 2002/0116626 A1 | 8/2002 | Wood .......................... 726/27 |
| 7,093,295 B1 | 8/2006 | Saito ........................... 726/80 | 2002/0122045 A1 | 9/2002 | Woodson et al. |
| 7,114,174 B1 | 9/2006 | Brooks et al. ............... 725/105 | 2002/0133558 A1 | 9/2002 | Fenno et al. ................. 709/208 |
| 7,116,894 B1 | 10/2006 | Chatterton | 2002/0137517 A1 | 9/2002 | Williams et al. ............. 455/444 |
| 7,127,734 B1 | 10/2006 | Amit ............................ 725/80 | 2002/0138830 A1 | 9/2002 | Nagaoka et al. |
| 7,130,576 B1 | 10/2006 | Gurantz et al. ............. 455/3.02 | 2002/0141582 A1 | 10/2002 | Kocher et al. ............... 380/200 |
| 7,139,398 B2 | 11/2006 | Candelore et al. ........... 380/200 | 2002/0144262 A1 | 10/2002 | Plotnick et al. .............. 725/32 |
| 7,140,033 B1 | 11/2006 | Durden et al. ................. 725/80 | 2002/0146237 A1 | 10/2002 | Safadi ......................... 386/94 |

| Publication No. | Date | Inventor | Class |
|---|---|---|---|
| 2002/0154892 A1 | 10/2002 | Hoshen et al. | 386/87 |
| 2002/0157112 A1 | 10/2002 | Kuhn | 725/113 |
| 2002/0166124 A1 | 11/2002 | Gurantz et al. | 725/78 |
| 2002/0174430 A1 | 11/2002 | Ellis et al. | |
| 2002/0174433 A1 | 11/2002 | Baumgartner et al. | |
| 2002/0174444 A1 | 11/2002 | Gatto et al. | 725/133 |
| 2002/0178445 A1 | 11/2002 | Eldering et al. | 725/32 |
| 2002/0187779 A1 | 12/2002 | Freeny | 455/422.1 |
| 2002/0194596 A1 | 12/2002 | Srivastava | 725/37 |
| 2002/0196941 A1 | 12/2002 | Isaacson et al. | |
| 2002/0198762 A1 | 12/2002 | Donato | 705/10 |
| 2003/0005300 A1 | 1/2003 | Noble et al. | 713/172 |
| 2003/0005452 A1 | 1/2003 | Rodriguez | 725/86 |
| 2003/0009763 A1 | 1/2003 | Crinon et al. | 725/92 |
| 2003/0014750 A1 | 1/2003 | Kamen | 725/25 |
| 2003/0026423 A1 | 2/2003 | Unger et al. | 380/217 |
| 2003/0028886 A1 | 2/2003 | Wang et al. | 725/78 |
| 2003/0028890 A1 | 2/2003 | Swart et al. | 725/91 |
| 2003/0044165 A1 | 3/2003 | Wood et al. | 386/83 |
| 2003/0063003 A1 | 4/2003 | Bero et al. | 340/573.1 |
| 2003/0063814 A1 | 4/2003 | Herley | 382/255 |
| 2003/0069964 A1 | 4/2003 | Shteyn et al. | 709/225 |
| 2003/0074565 A1 | 4/2003 | Wasilewski et al. | |
| 2003/0093812 A1 | 5/2003 | Chang et al. | 725/133 |
| 2003/0097563 A1 | 5/2003 | Moroney et al. | 713/170 |
| 2003/0097655 A1 | 5/2003 | Novak | |
| 2003/0097663 A1 | 5/2003 | Russ et al. | 725/132 |
| 2003/0108199 A1 | 6/2003 | Pinder et al. | 380/200 |
| 2003/0108336 A1 | 6/2003 | Schramel | 386/95 |
| 2003/0135859 A1 | 7/2003 | Putterman et al. | 725/86 |
| 2003/0142664 A1 | 7/2003 | Gerszberg et al. | 370/354 |
| 2003/0145336 A1 | 7/2003 | Matsuzaki et al. | 725/136 |
| 2003/0149986 A1 | 8/2003 | Mayfield et al. | 725/63 |
| 2003/0149991 A1 | 8/2003 | Reidhead et al. | 725/119 |
| 2003/0154477 A1 | 8/2003 | Hassell et al. | |
| 2003/0159140 A1 | 8/2003 | Candelore | 725/31 |
| 2003/0159157 A1 | 8/2003 | Chan | 725/151 |
| 2003/0177495 A1 | 9/2003 | Needham et al. | |
| 2003/0181160 A1 | 9/2003 | Hirsch | 455/3.02 |
| 2003/0192047 A1 | 10/2003 | Gaul et al. | 725/39 |
| 2003/0192061 A1* | 10/2003 | Hwangbo et al. | 725/138 |
| 2003/0202772 A1 | 10/2003 | Dow et al. | 386/46 |
| 2003/0204856 A1 | 10/2003 | Buxton | 725/120 |
| 2003/0207672 A1 | 11/2003 | Dang et al. | 455/150.1 |
| 2003/0233667 A1 | 12/2003 | Umipig et al. | 725/152 |
| 2003/0235308 A1 | 12/2003 | Boynton et al. | 380/270 |
| 2003/0237093 A1 | 12/2003 | Marsh | 725/46 |
| 2004/0003393 A1 | 1/2004 | Gutta et al. | 725/25 |
| 2004/0003398 A1 | 1/2004 | Donian et al. | |
| 2004/0012717 A1 | 1/2004 | Robertson et al. | 348/564 |
| 2004/0017913 A1 | 1/2004 | Hawkes et al. | 380/37 |
| 2004/0025179 A1 | 2/2004 | Russ et al. | 725/46 |
| 2004/0028216 A1 | 2/2004 | Freyman | 379/406.01 |
| 2004/0032902 A1 | 2/2004 | Koifman et al. | 375/222 |
| 2004/0032950 A1 | 2/2004 | Graunke | 380/42 |
| 2004/0034874 A1 | 2/2004 | Hord et al. | 725/136 |
| 2004/0040035 A1 | 2/2004 | Carlucci et al. | 725/32 |
| 2004/0049793 A1 | 3/2004 | Chou | 725/87 |
| 2004/0051638 A1 | 3/2004 | Green | 340/539.32 |
| 2004/0054771 A1 | 3/2004 | Roe et al. | 709/224 |
| 2004/0060072 A1 | 3/2004 | Klein | 725/127 |
| 2004/0064714 A1 | 4/2004 | Carr | 713/193 |
| 2004/0068739 A1 | 4/2004 | Russ et al. | |
| 2004/0068744 A1 | 4/2004 | Claussen et al. | 725/81 |
| 2004/0068747 A1 | 4/2004 | Robertson et al. | 725/98 |
| 2004/0068752 A1 | 4/2004 | Parker | 725/120 |
| 2004/0068753 A1 | 4/2004 | Robertson et al. | 725/126 |
| 2004/0068754 A1 | 4/2004 | Russ | 725/126 |
| 2004/0078825 A1 | 4/2004 | Murphy | 725/131 |
| 2004/0090971 A1 | 5/2004 | Anderson | |
| 2004/0100897 A1 | 5/2004 | Shattil | 725/109 |
| 2004/0104926 A1 | 6/2004 | Murray et al. | |
| 2004/0107445 A1 | 6/2004 | Amit | 725/127 |
| 2004/0109497 A1 | 6/2004 | Koval | 375/222 |
| 2004/0117483 A1 | 6/2004 | Singer et al. | |
| 2004/0117831 A1 | 6/2004 | Ellis et al. | 725/53 |
| 2004/0128681 A1 | 7/2004 | Hancock | 725/30 |
| 2004/0128682 A1 | 7/2004 | Liga et al. | 725/35 |
| 2004/0133911 A1 | 7/2004 | Russ et al. | 725/69 |
| 2004/0163130 A1 | 8/2004 | Gray et al. | |
| 2004/0172658 A1 | 9/2004 | Rakib et al. | 725/120 |
| 2004/0177369 A1 | 9/2004 | Akins, III | |
| 2004/0177381 A1 | 9/2004 | Kliger et al. | 725/131 |
| 2004/0220791 A1 | 11/2004 | Lamkin et al. | |
| 2004/0221304 A1 | 11/2004 | Sparrell | 725/34 |
| 2004/0221308 A1 | 11/2004 | Cuttner et al. | |
| 2004/0250272 A1 | 12/2004 | Durden et al. | 725/25 |
| 2004/0250273 A1 | 12/2004 | Swix et al. | 725/25 |
| 2004/0255326 A1 | 12/2004 | Hicks et al. | 725/81 |
| 2004/0257976 A1 | 12/2004 | Alsobrook et al. | 370/206 |
| 2004/0261100 A1 | 12/2004 | Huber et al. | |
| 2004/0261126 A1 | 12/2004 | Addington et al. | 725/135 |
| 2005/0004873 A1 | 1/2005 | Pou et al. | 705/501 |
| 2005/0005287 A1 | 1/2005 | Claussen | |
| 2005/0022248 A1 | 1/2005 | Robertson et al. | 725/118 |
| 2005/0028190 A1 | 2/2005 | Rodriguez et al. | 725/22 |
| 2005/0028208 A1 | 2/2005 | Ellis et al. | 725/58 |
| 2005/0030910 A1 | 2/2005 | Robertson et al. | 370/276 |
| 2005/0042999 A1 | 2/2005 | Rappaport | 455/307 |
| 2005/0044762 A1 | 3/2005 | Atluri | 40/600 |
| 2005/0050557 A1 | 3/2005 | Gabryjelski | |
| 2005/0063422 A1 | 3/2005 | Lazar et al. | 370/532 |
| 2005/0065780 A1 | 3/2005 | Wiser et al. | 704/201 |
| 2005/0073945 A1 | 4/2005 | Garcia, Jr. et al. | 370/206 |
| 2005/0076357 A1 | 4/2005 | Fenne | 725/14 |
| 2005/0155052 A1 | 7/2005 | Ostrowska et al. | 725/25 |
| 2005/0234992 A1 | 10/2005 | Haberman | 707/104.1 |
| 2005/0235323 A1 | 10/2005 | Ellis et al. | 725/58 |
| 2005/0251824 A1 | 11/2005 | Thomas et al. | |
| 2005/0251827 A1 | 11/2005 | Ellis et al. | 725/47 |
| 2005/0262542 A1 | 11/2005 | DeWeese et al. | 725/106 |
| 2006/0010481 A1 | 1/2006 | Wall et al. | 725/151 |
| 2006/0069645 A1 | 3/2006 | Chen et al. | 705/51 |
| 2006/0080360 A1 | 4/2006 | Young et al. | 707/104.1 |
| 2006/0095939 A1 | 5/2006 | Jutzi | 725/78 |
| 2006/0117354 A1 | 6/2006 | Schutte et al. | 725/78 |
| 2006/0150225 A1 | 7/2006 | Hegg et al. | 725/89 |
| 2006/0184967 A1 | 8/2006 | Maynard et al. | 725/46 |
| 2006/0218581 A1 | 9/2006 | Ostrowska et al. | 725/38 |
| 2006/0218591 A1 | 9/2006 | Billmaier et al. | 725/52 |
| 2006/0259584 A1 | 11/2006 | Watson et al. | 709/218 |
| 2007/0022307 A1 | 1/2007 | Ferrari | |
| 2007/0077038 A1 | 4/2007 | Wall | |
| 2007/0079341 A1 | 4/2007 | Russ et al. | |
| 2007/0094698 A1 | 4/2007 | Bountour et al. | 725/132 |
| 2007/0143776 A1 | 6/2007 | Russ | 725/14 |
| 2007/0300258 A1 | 12/2007 | O'Conner et al. | 725/44 |
| 2008/0066085 A1 | 3/2008 | Davies et al. | 719/321 |
| 2008/0072272 A1 | 3/2008 | Robertson et al. | |
| 2008/0148325 A1 | 6/2008 | Robertson et al. | 725/98 |
| 2008/0201758 A1 | 8/2008 | Davies et al. | 725/133 |
| 2008/0271094 A1 | 10/2008 | Kliger et al. | |
| 2008/0301738 A1 | 12/2008 | Davies et al. | 725/87 |
| 2009/0077586 A1 | 3/2009 | Wall et al. | |
| 2009/0083819 A1 | 3/2009 | Robertson et al. | 725/118 |
| 2009/0150922 A1 | 6/2009 | Russ et al. | |
| 2009/0193452 A1 | 7/2009 | Russ et al. | |
| 2010/0175093 A1 | 7/2010 | Arnold et al. | |

FOREIGN PATENT DOCUMENTS

| | | |
|---|---|---|
| EP | 0 989 557 | 3/2000 |
| EP | 1 028 551 | 8/2000 |
| EP | 0 107 600 | 6/2001 |
| EP | 1 117 214 | 7/2001 |
| EP | 1 175 087 | 7/2001 |

| | | |
|---|---|---|
| EP | 1145244 A1 | 10/2001 |
| EP | 1 213 919 | 6/2002 |
| EP | 1 443 766 | 8/2004 |
| EP | 1443766 | 8/2004 |
| EP | 1 463 324 | 9/2004 |
| WO | WO 95/25402 | 9/1995 |
| WO | WO 96/19079 | 6/1996 |
| WO | WO 98/26584 | 6/1998 |
| WO | WO 98/37648 | 8/1998 |
| WO | WO 99/01984 | 1/1999 |
| WO | WO 99/35842 A1 | 7/1999 |
| WO | WO 99/35844 | 7/1999 |
| WO | WO 99/65244 | 12/1999 |
| WO | WO 00/04707 | 1/2000 |
| WO | WO 00/07372 | 2/2000 |
| WO | WO 00/45590 | 3/2000 |
| WO | WO 00/35201 | 6/2000 |
| WO | WO 01/01677 | 1/2001 |
| WO | WO 01/47234 | 6/2001 |
| WO | WO 01/56286 | 8/2001 |
| WO | WO 01/56297 | 8/2001 |
| WO | WO 01/74003 | 10/2001 |
| WO | WO 01/78382 | 10/2001 |
| WO | WO 01/86948 | 11/2001 |
| WO | WO 02/07378 | 1/2002 |
| WO | WO 02/11418 | 2/2002 |
| WO | WO 02/11446 | 2/2002 |
| WO | WO 02/17642 | 2/2002 |
| WO | WO 02/19623 | 3/2002 |
| WO | WO 02/47388 | 6/2002 |
| WO | WO 02/097997 | 12/2002 |
| WO | WO 02 097997 | 12/2002 |
| WO | WO 03/032620 | 4/2003 |
| WO | WO 03/039154 | 5/2003 |
| WO | WO 2004/023717 | 3/2004 |
| WO | WO 2004/032514 | 4/2004 |
| WO | WO 2004 036808 | 4/2004 |
| WO | WO 2004/036808 * | 4/2004 |
| WO | WO 2004/036892 | 4/2004 |
| WO | WO2004036808 A2 | 4/2004 |
| WO | WO 2004/064296 | 7/2004 |
| WO | WO 2004/098190 | 11/2004 |
| WO | WO 2005/034515 | 4/2005 |
| WO | WO 2006/093741 | 9/2006 |

OTHER PUBLICATIONS

Alexis De Lattre et al; Videolan Streaming Howto, 2005, pp. 1-61.
Matsushita Electric Industrial Co., Ltd. "*DVB Call for Proposals for Content Protection & Copy Management Technologies*"; NetDRM Technology; XP002349078, Oct. 19, 2001; pp. 1-44.
Kerr, G., "A Review of Fully Interactive Video on Demand" Signal Processing Image Communication, Elsevier Science Publishers, Amsterdam, NL, vol. 8, No. 3, Apr. 1996, pp. 173-190, XP004047063 ISSN: 09235965.
Microsoft Computer Dictionary, 1999, Microsoft Press, 4th Edition, p. 123.
SCTE, "POD Copy Protection System," SCTE Society of Cable Telecommunications Engineers, [Online] Dec. 31, 2004, pp. 1-68, XP002414048, http://www.scte.org/documents/pdf/ANSISCTE412004.pdf.
Delta Beta In-Flight, www.deltabeta.com, retrieved from the internet on Jul. 17, 2008.
SCTE, "Client-Based Digital Program Insertion Business Goal," DVS/632r1, Mar. 27, 2004.
SCTE, "Working Group Work Plan 5," DVS 177, Sep. 1, 1998.
SCTE, "Proposed Amendment of SCTE 30 2001 Digital Program Insertion Splicing API," DVS 638r3, Feb. 4, 2005.
Broadcast Engineering, "Digital Program Insertion," Business Models, Jul. 1, 2002.
nCUBE, "Digital Program Insertion," nCUBE, May 2001.
Matsushita Electric Industrial Co., Ltd. "DVB Call for Proposals for Content Protection & Copy Management Technologies," NetDRM Technology, XP002349078, Oct. 19, 2001, pp. 1-44.
Written Opinion mailed Nov. 7, 2005 in PCT Application No. PCT/US2005/016290.
International Search Report dated Oct. 31, 2005 in PCT Application No. PCT/US2005/016290.
EP Communication dated Jul. 12, 2007 in Application No. 05 748 223.4-1241.
International Preliminary Examination Report dated Dec. 21, 2005 in PCT/US2003/32527.
Written Opinion mailed Dec. 10, 2004 in PCT/US2003/32527.
International Search Report dated Nov. 10, 2004 in PCT/US2003/32527.
International Preliminary Examination Report dated Jan. 18, 2006 in PCT/US2003/33686.
Written Opinion mailed Jun. 3, 2005 in PCT/US2003/33686.
International Search Report dated Feb. 6, 2004 in PCT/US2003/33686.
Canadian Office Action dated May 30, 2008 in Application No. 2,520,505.
Canadian Office Action dated Sep. 4, 2008 in Application No. 2,501,865.
International Search Report dated Sep. 29, 2006 in PCT/US2006/006199.
Written Opinion dated Oct. 12, 2006 in PCT/US2006/006199.
International Search Report dated Jan. 10, 2007 in PCT/US2006/033967.
Written Opinion mailed Mar. 2, 2007 in PCT/US2006/033967.
EP Communication dated Oct. 14, 2009 in Application No. 03 777 604.4-1241.
Supplementary European Search Report dated Jun. 18, 2009 in Application No. 03 777 604.4.
EP Communication dated May 27, 2009 in Application No. 03 774 942.1.
Supplementary European Search Report dated Feb. 6, 2009 in Application No. 03 774 942.1-1241.
International Search Report dated Mar. 1, 2005 in OCT/US2004/032389.
U.S. Official Action mailed Dec. 5, 2003 in U.S. Appl. No. 10/235,201.
U.S. Official Action mailed Feb. 13, 2004 in U.S. Appl. No. 10/342,670.
U.S. Official Action mailed May 7, 2004 in U.S. Appl. No. 10/235,201.
U.S. Official Action mailed Jul. 27, 2004 in U.S. Appl. No. 10/342,670.
U.S. Official Action mailed Sep. 10, 2004 in U.S. Appl. No. 10/437,556.
U.S. Official Action mailed Mar. 21, 2005 in U.S. Appl. No. 10/212,017.
U.S. Official Action mailed Mar. 23, 2005 in U.S. Appl. No. 10/342,670.
U.S. Official Action mailed Jun. 15, 2005 in U.S. Appl. No. 10/437,556.
U.S. Official Action mailed Jul. 27, 2005 in U.S. Appl. No. 10/235,201.
U.S. Official Action mailed Aug. 11, 2005 in U.S. Appl. No. 10/342,670.
U.S. Official Action mailed Oct. 19, 2005 in U.S. Appl. No. 10/212,017.
U.S. Official Action mailed Jan. 11, 2006 in U.S. Appl. No. 10/235,201.
U.S. Official Action mailed Jan. 30, 2006 in U.S. Appl. No. 10/437,556.
U.S. Official Action mailed Feb. 8, 2006 in U.S. Appl. No. 10/342,670.
U.S. Official Action mailed Mar. 13, 2006 in U.S. Appl. No. 10/008,581.
U.S. Official Action mailed Apr. 19, 2006 in U.S. Appl. No. 10/212,017.
U.S. Official Action mailed Jun. 28, 2006 in U.S. Appl. No. 10/342,670.

U.S. Official Action mailed Jun. 30, 2006 in U.S. Appl. No. 10/437,556.
U.S. Official Action mailed Jul. 31, 2006 in U.S. Appl. No. 10/235,201.
U.S. Official Action mailed Oct. 31, 2006 in U.S. Appl. No. 10/342,670.
U.S. Official Action mailed Nov. 17, 2006 in U.S. Appl. No. 10/235,201.
U.S. Official Action mailed Nov. 20, 2006 in U.S. Appl. No. 10/437,556.
U.S. Official Action mailed Dec. 18, 2006 in U.S. Appl. No. 10/008,581.
U.S. Official Action mailed Mar. 21, 2007 in U.S. Appl. No. 10/294,947.
U.S. Official Action mailed Apr. 25, 2007 in U.S. Appl. No. 10/008,581.
U.S. Official Action mailed May 3, 2007 in U.S. Appl. No. 10/437,556.
U.S. Official Action mailed May 4, 2007 in U.S. Appl. No. 10/263,160.
U.S. Official Action mailed May 4, 2007 in U.S. Appl. No. 10/924,077.
U.S. Official Action mailed May 7, 2007 in U.S. Appl. No. 10/342,670.
U.S. Official Action mailed May 8, 2007, in U.S. Appl. No. 10/263,449.
U.S. Official Action mailed Jul. 10, 2007 in U.S. Appl. No. 10/104,921.
U.S. Official Action mailed Jul. 10, 2007 in U.S. Appl. No. 10/263,270.
U.S. Official Action mailed Jul. 18, 2007 in U.S. Appl. No. 11/162,232.
U.S. Official Action mailed Sep. 4, 2007 in U.S. Appl. No. 10/712,289.
U.S. Official Action mailed Sep. 10, 2007 in U.S. Appl. No. 10/842,823.
U.S. Official Action mailed Oct. 4, 2007 in U.S. Appl. No. 10/008,581.
U.S. Official Action mailed Oct. 5, 2007 in U.S. Appl. No. 10/294,947.
U.S. Official Action mailed Nov. 15, 2007 in U.S. Appl. No. 10/924,077.
U.S. Official Action mailed Nov. 16, 2007 in U.S. Appl. No. 10/263,160.
U.S. Official Action mailed Nov. 29, 2007 in U.S. Appl. No. 10/104,921.
U.S. Official Action mailed Nov. 30, 2007 in U.S. Appl. No. 10/263,449.
U.S. Official Action mailed Jan. 4, 2008 in U.S. Appl. No. 10/342,670.
U.S. Official Action mailed Jan. 10, 2008 in U.S. Appl. No. 10/923,948.
U.S. Official Action mailed Jan. 14, 2008 in U.S. Appl. No. 10/263,270.
U.S. Official Action mailed Jan. 29, 2008 in U.S. Appl. No. 11/162,232.
U.S. Official Action mailed Feb. 8, 2008 in U.S. Appl. No. 10/403,485.
U.S. Official Action mailed Mar. 18, 2008 in U.S. Appl. No. 10/008,581.
U.S. Official Action mailed Mar. 18, 2008 in U.S. Appl. No. 10/924,077.
U.S. Official Action mailed Mar. 19, 2008 in U.S. Appl. No. 10/712,289.
U.S. Official Action mailed Apr. 4, 2008 in U.S. Appl. No. 10/842,823.
U.S. Official Action mailed Apr. 24, 2008 in U.S. Appl. No. 10/104,921.
U.S. Official Action mailed May 13, 2008 in U.S. Appl. No. 10/263,160.
U.S. Official Action mailed May 15, 2008 in U.S. Appl. No. 10/294,947.
U.S. Offiical Action mailed Jun. 2, 2008 in U.S. Appl. No. 10/998,879.
U.S. Official Action mailed Jun. 12, 2008 in U.S. Appl. No. 10/263,449.
U.S. Official Action mailed Jun. 30, 2008 in U.S. Appl. No. 10/907,540.
U.S. Official Action mailed Jul. 8, 2008 in U.S. Appl. No. 11/069,439.
U.S. Official Action mailed Jul. 9, 2008 in U.S. Appl. No. 11/069,440.
U.S. Official Action mailed Jul. 25, 2008 in U.S. Appl. No. 10/342,670.
U.S. Official Action mailed Sep. 5, 2008 in U.S. Appl. No. 11/162,232.
U.S. Official Action mailed Sep. 5, 2008 in U.S. Appl. No. 10/263,270.
U.S. Official Action mailed Sep. 17, 2008 in U.S. Appl. No. 10/403,485.
U.S. Official Action mailed Sep. 18, 2008 in U.S. Appl. No. 10/008,581.
U.S. Official Action mailed Sep. 19, 2008 in U.S. Appl. No. 10/263,160.
U.S. Official Action mailed Sep. 26, 2008 in U.S. Appl. No. 10/212,017.
U.S. Official Action mailed Oct. 21, 2008 in U.S. Appl. No. 10/842,823.
U.S. Official Action mailed Oct. 22, 2008 in U.S. Appl. No. 10/924,077.
U.S. Official Action mailed Oct. 29, 2008 in U.S. Appl. No. 10/712,289.
U.S. Official Action mailed Nov. 6, 2008 in U.S. Appl. No. 10/104,921.
U.S. Official Action mailed Nov. 26, 2008 in U.S. Appl. No. 11/069,439.
U.S. Official Action mailed Nov. 28, 2008 in U.S. Appl. No. 10/998,879.
U.S. Official Action mailed Dec. 12, 2008 in U.S. Appl. No. 10/294,947.
U.S. Official Action mailed Jan. 7, 2009 in U.S. Appl. No. 10/904,540.
U.S. Official Action mailed Jan. 23, 2009 in U.S. Appl. No. 11/169,440.
U.S. Official Action mailed Jan. 28, 2009 in U.S. Appl. No. 10/342,670.
U.S. Official Action mailed Feb. 4, 2009 in U.S. Appl. No. 10/263,449.
U.S. Official Action mailed Feb. 6, 2009 in U.S. Appl. No. 10/263,270.
U.S. Official Action mailed Feb. 9, 2009 in U.S. Appl. No. 10/008,581.
U.S. Official Action mailed Mar. 2, 2009 in U.S. Appl. No. 11/564,347.
U.S. Official Action mailed Mar. 13, 2009 in U.S. Appl. No. 11/069,439.
U.S. Official Action mailed Mar. 18, 2009 in U.S. Appl. No. 10/403,485.
U.S. Official Action mailed Mar. 20, 2009 in U.S. Appl. No. 11/162,232.
U.S. Official Action mailed Apr. 3, 2009 in U.S. Appl. No. 10/263,160.
U.S. Official Action mailed Apr. 15, 2009 in U.S. Appl. No. 10/712,289.
U.S. Official Action mailed May 21, 2009 in U.S. Appl. No. 10/294,947.
U.S. Official Action mailed May 21, 2009 in U.S. Appl. No. 10/998,879.
U.S. Official Action mailed Jun. 10, 2009 in U.S. Appl. No. 10/907,540.
U.S. Official Action mailed Jun. 11, 2009 in U.S. Appl. No. 10/104,921.
U.S. Official Action mailed Jul. 29, 2009 in U.S. Appl. No. 10/924,077.

U.S. Official Action mailed Aug. 19, 2009 in U.S. Appl. No. 11/069,440.
U.S. Official Action mailed Aug. 28, 2009 in U.S. Appl. No. 10/263,449.
U.S. Official Action mailed Sep. 1, 2009 in U.S. Appl. No. 10/263,270.
U.S. Official Action mailed Sep. 3, 2009 in U.S. Appl. No. 10/403,485.
U.S. Official Action mailed Sep. 4, 2009 in U.S. Appl. No. 11/564,347.
U.S. Official Action mailed Sep. 11, 2009 in U.S. Appl. No. 10/263,160.
U.S. Official Action mailed Sep. 29, 2009 in U.S. Appl. No. 10/712,289.
U.S. Official Action mailed Sep. 30, 2009 in U.S. Appl. No. 11/069,439.
U.S. Official Action mailed Oct. 16, 2009 in U.S. Appl. No. 12/056,812.
U.S. Official Action mailed Nov. 16, 2009 in U.S. Appl. No. 10/907,540.
Canadian Office Action dated Jul. 24, 2009 in Application No. 2,566,742.
EP Summons to attend oral proceedings dated Jan. 27, 2010 in Application No. 03 774 942.1-1241.
U.S. Official Action mailed May 1, 2008 in U.S. Appl. No. 10/923,948.
U.S. Official Action mailed Nov. 30, 2009 in U.S. Appl. No. 10/998,879.
U.S. Official Action mailed Dec. 16, 2009 in U.S. Appl. No. 10/294,947.
U.S. Official Action mailed Dec. 16, 2009 in U.S. Appl. No. 11/564,347.
U.S. Official Action mailed Jan. 14, 2010 in U.S. Appl. No. 10/104,921.
U.S Official Action mailed Jan. 21, 2010 in U.S. Appl. No. 11/069,439.
U.S. Official Action mailed Jan. 25, 2010 in U.S. Appl. No. 11/162,232.
U.S. Official Action mailed Jan. 28, 2010 in U.S. Appl. No. 10/924,077.
U.S. Appl. No. 09/332,244 filed Jun. 11, 1999 entitled "Client-Server Based Interactive Television Program Guide System With Remote Server Recording", Inventors: Michael Ellis, William Thomas, Thomas Lemmons.
U.S. Appl. No. 09/354,344 filed Jul. 16, 1999 entitled "Interactive Television Program Guide With Remote Access", Inventors: Michael Ellis, William Thomas, Joel Hassell, Thomas Lemmons, David Berezowski, Robert Knee, Robert McCoy.
U.S. Appl. No. 09/356,161 filed Jul. 16, 1999 entitled "Interactive Television Program Guide System Having Multiple Devices Within a Household", Inventors: Michael Ellis, William Thomas, Thomas Lemmons.
Supplementary European Search Report dated Jul. 14, 2005 in Application No. 03 74 5552.
International Search Report dated Jun. 14, 2006 in PCT/US2006/006201.
EP Communication dated Mar. 10, 2008 in Application No. 05 852 294.7.
International Search Report dated Jun. 9, 2008 in PCT/US2007/085694.
EP Communication dated Jul. 18, 2008 in Application No. 05 852 294.7.
EP Communication dated Feb. 27, 2009 in Application No. 06 739 511.1.
EP Communication dated Apr. 6, 2009 in Application No. 05 852 294.7-1522.
Canadian Office Action dated Apr. 15, 2009 in Application No. 2,478,838.
EP Communication dated Aug. 24, 2009 in Application No. 06 735 737.6-241.
Canadian Office Action dated Oct. 5, 2009 in Application No. 2,588,912.
EP Communication dated Oct. 29, 2009 in Application No. 06 815 494.7.
Canadian Office Action dated Nov. 2, 2009 in Application No. 2,599,947.
Canadian Office Action dated Nov. 2, 2009 in Application No. 2,603,257.
Canadian Office Action dated Dec. 15, 2009 in Application No. 2,520,505.
Canadian Office Action dated Jan. 13, 2010 in Application No. 2,541,161.
Canadian Office Action dated Mar. 4, 2010 in Application No. 2,599,941.
EP Communication dated Apr. 12, 2010 in Application No. 03 777 604.4-1241.
U.S. Official Action mailed Nov. 2, 2007 in U.S. Appl. No. 10/676,968.
U.S. Official Action mailed Jul. 23, 2008 in U.S. Appl. No. 10/676,968.
U.S. Official Action mailed Dec. 26, 2008 in U.S. Appl. No. 11/164,337.
U.S. Official Action mailed Apr. 6, 2009 in U.S. Appl. No. 11/945,284.
U.S. Official Action mailed Jul. 21, 2009 in U.S. Appl. No. 11/164,337.
U.S. Official Action mailed Oct. 6, 2009 in U.S. Appl. No. 12/352,140.
U.S. Official Action mailed Oct. 29, 2009 in U.S. Appl. No. 11/945,284.
U.S. Official Action mailed Dec. 30, 2009 in U.S. Appl. No.11/164,337.
U.S. Official Action mailed Feb. 17, 2010 in U.S. Appl. No. 10/263,449.
U.S. Official Action mailed Feb. 24, 2010 in U.S. Appl. No. 10/403,485.
U.S. Official Action mailed Mar. 1, 2010 in U.S. Appl. No. 10/712,289.
U.S. Official Action mailed Mar. 3, 2010 in U.S. Appl. No. 10/263,160.
U.S. Official Action mailed Apr. 7, 2010 in U.S. Appl. No. 12/056,812.
U.S. Official Action mailed May 5, 2010 in U.S. Appl. No. 10/998,879.
U.S. Appl. No. 09/568,932 filed May 11, 2000 entitled "Electronic Content Guide Renders Content Resources Transparent", Inventors: Eugene Shteyn et al.
U.S. Office Action dated Dec. 26, 2008 cited in U.S. Appl. No. 11/164,337.
U.S. Final Office Action dated Jul. 21, 2009 cited in U.S. Appl. No. 11/164,337.
International Search Report dated Sep. 28, 2006 in PCT/US2006/010764.
EP Communication dated Mar. 18, 2010 in Application No. 06 815 494.7.
Canadian Office Action dated Jul. 2, 2010 in Application No. 2,630,123.
U.S. Official Action mailed May 31, 2005 in U.S. Appl. No. 09/332,244.
U.S. Official Action mailed Sep. 20, 2006 in U.S. Appl. No. 10/036,329.
U.S. Official Action mailed Dec. 19, 2006 in U.S. Appl. No. 09/332,244.
U.S. Official Action mailed May 29, 2007 in U.S. Appl. No. 10/036,329.
U.S. Official Action mailed Jun. 27, 2007 in U.S. Appl. No. 09/332,244.
U.S. Official Action mailed May 18, 2010 in U.S. Appl. No. 10/907,540.
U.S. Official Action mailed May 25, 2010 in U.S. Appl. No. 11/069,439.
U.S. Official Action mailed May 26, 2010 in U.S. Appl. No. 10/263,270.
U.S. Official Action mailed Jun. 8, 2010 in U.S. Appl. No. 11/564,347.

U.S. Official Action mailed July 16, 2010 in U.S. Appl. No. 11/164,337.
U.S. Official Action mailed July 27, 2010 in U.S. Appl. No. 10/924,077.
International Search Report dated Jan. 25, 2007 in PCT/US2006/037542.
Written Opinion dated Jan. 25, 2007 in PCT/US2006/037542.
International Search Report dated Oct. 29, 2007 in PCT/US2006/060967.
Written Opinion dated Oct. 29, 2007 in PCT/US2006/060967.
U.S. Official Action mailed Aug. 17, 2010 in U.S. Appl. No. 12/036,329.
U.S. Official Action mailed Aug. 20, 2010 in U.S. Appl. No. 11/945,284.
U.S. Official Action mailed Aug. 27, 2010 in U.S. Appl. No. 10/403,485.
U.S. Official Action mailed Aug. 31, 2010 in U.S. Appl. No. 12/416,392.
U.S. Official Action mailed Sep. 9, 2010 in U.S. Appl. No. 10/998,879.
U.S. Official Action mailed Sep. 14, 2010 in U.S. Appl. No. 11/942,077.
U.S. Appl. No. 09/262,870 filed Mar. 4, 1999 entitled "Program Guide System with Video-On-Demand Browsing," Inventors: Michael D. Ellis.
Canadian Office Action dated Sep. 1, 2010 cited in Application No. 2,494,494.
Canadian Office Action dated Oct. 14, 2010 cited in Application No. 2,501,112.
U.S. Final Office Action mailed Oct. 15, 2010 cited in U.S. Appl. No. 10/907,540.
U.S. Final Office Action mailed Nov. 10, 2010 cited in U.S. Appl. No. 10/263,270.

* cited by examiner

|  |  |  | (Video) |  |  |
|---|---|---|---|---|---|
|  |  | 5 | Thu 1/17 |  | 7:00 AM |
|  | 7:00 AM | 7:30 AM | 8:00 AM | 8:30 AM | 8:30 AM |
| PPV 249 | ◁◁ Harry Potter | | Kate and Leopold | | ▷▷ |
| PPV 250 | | ◁◁ Lord of The Rings | | The Majestic | ▷▷ |
| PVR 310 | Recorded List | | | | |
| NG 320 | Network Guide | | | | |
| DVD 330 | Star Wars | | | | Menu and Bonus Footage |
| Thu 1/17 | A Browse By | | B Date | | C Customize |

FIG. 3

|  |  | (Video) |  |  |
|---|---|---|---|---|
|  |  | 5 | Thu 1/17 | 7:00 AM |
|  | 7:00 AM | 7:30 AM | 8:00 AM | 8:30 AM | 8:30 AM |
| PPV 249 | ◁◁ Harry Potter | | Kate and Leopold | ▷▷ | |
| PPV 250 | ◁◁ Lord of The Rings | | The Majestic | ▷▷ | |
| PVR 310 | Recorded List | | | | |
| NG 320 | Network Guide | | | | |
| DVD 330 | Star Wars ▷▷ | | | | |
| DVD Menu 410 | DVD Menu and Bonus Footage | | | | |
| Thu 1/17 | △A Browse By | | □B Date | ○C Customize | |

FIG. 4

DVD PLAYBACK OVER MULTI-ROOM BY COPYING TO HDD

FIELD OF THE INVENTION

This invention relates in general to broadband communications systems, and more particularly, to playing a DVD to multiple set-top boxes in a networked multi-room system.

DESCRIPTION OF THE RELATED ART

Broadband communications systems, such as satellite and cable television systems, are now capable of providing many services in addition to analog broadcast video. In implementing enhanced programming, the set-top box (STB), otherwise known as a device, has become an important computing device for accessing various video services. In addition to supporting traditional analog broadcast video functionality, many STBs also provide other functionality, such as, for example, an interactive program guide (IPG), video-on-demand (VOD), subscription video-on-demand (SVOD), and functionality traditionally associated with a conventional computer, such as e-mail. Trick play features such as pause, fast forward, rewind, skip ahead, or skip back have also been included. While watching a presentation, users now have enhanced control of their viewing experience.

Recently, new functionality has been added to conventional STBs—namely the ability to play a DVD and record an incoming video stream in digitized form onto a mass storage device, such as a hard disk drive, play back that recorded video as desired by the user, and transfer the video to a removable, archival storage device possibly using a DVD recorder. This functionality has become known as a "digital video recorder" (DVR) or personal video recorder (PVR) and is viewed as a superior alternative to conventional video tape recorders for capture and subsequent playback of programming content.

A STB is typically connected to a television set and located at the home of the cable or satellite system subscriber. Since the STB is located at a subscriber's premises, it typically may be used by two or more users (e.g., household members). Television has become so prevalent in the United States that the typical household may have two or more television sets, each television set requiring its own STB if the subscriber wishes to have access to enhanced functionality.

A networked multimedia system (NMS) is described in copending U.S. patent application Ser. No. 10/342,670, filed Jan. 15, 2003, the disclosure and teachings of which are hereby incorporated by reference. The NMS allows a plurality of remote devices in the premises to be locally networked (i.e., home-networked). One of the remote devices typically acts as the server or primary device (i.e., the primary set-top box (STB)) in the NMS. The primary device receives and forwards upon request broadband multimedia presentations (e.g., analog or digital television channels (i.e., audio/video signals), IP signals, video-on-demand (VOD) signals, administrative signals, etc.) throughout the local network to the plurality of remote devices (i.e., client devices). Furthermore, the remote devices are each capable of requesting and seamlessly receiving from the primary device resident presentations, such as a stored or recorded presentation, the interactive program guide, or the network guide, for example.

This new technology also allows multiple users in a household to access material on the primary set-top box through remote set-top boxes. To increase functionality, there is a need for the ability to play a DVD at the primary device and then view the presentation, or movie, at multiple remote devices either simultaneously or at varying times.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

FIG. 3 illustrates the IPG of FIG. 2 further including functionality listings, such as a DVD.

FIG. 4 illustrates an alternative embodiment of the IPG of FIG. 2 further including functionality listings, such as a DVD and DVD menu options.

DETAILED DESCRIPTION

The embodiments of the invention can be understood in the context of a broadband communications system and a local network system. Note, however, that the invention may be embodied in many different forms and should not be construed as limited to the embodiments set forth herein. For example, transmitted broadband signals may include at least one of video/audio, telephony, data, or Internet Protocol (IP) signals, to name but a few. Furthermore, remote devices included in the local network system receiving the transmitted broadband signals may include a set-top terminal (STB), a television, a computer, a personal digital assistant (PDA), or other display device. Moreover, in accordance with the present invention a multi-room interactive network guide can have various features, functions, and presentations when displayed. All examples given herein, therefore, are intended to be non-limiting and are provided in order to help clarify the description of the invention.

Figure 1:
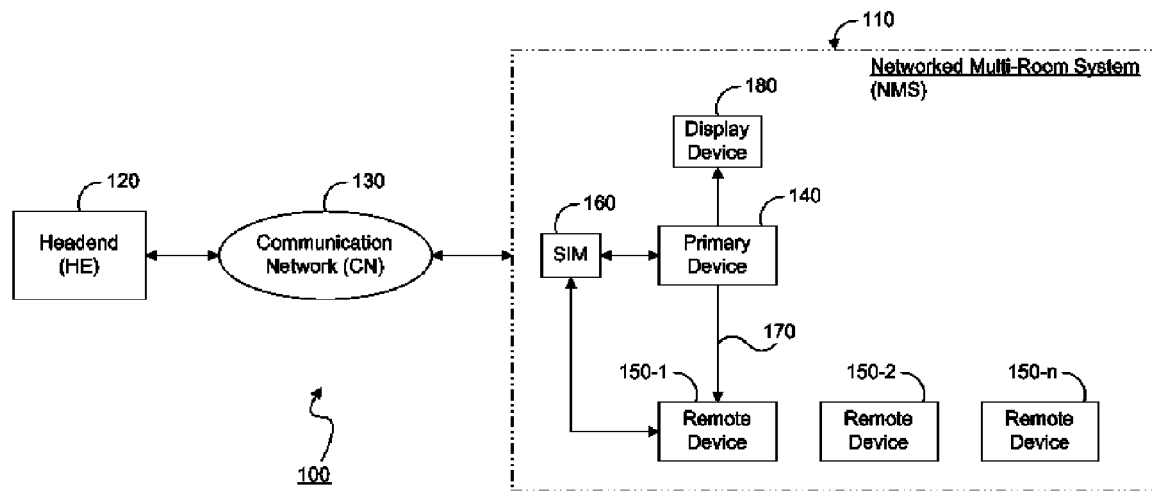
FIG. 1 is a simplified block diagram depicting a non-limiting example of a conventional broadband communications system with a networked multi-room system (NMS).

FIG. 1 is a simplified block diagram depicting a non-limiting example of a conventional broadband communications system 100. In this example, the communications system 100 includes a local networked multi-room system (NMS) 110 that is coupled to a headend (HE) 120 via a communications network (CN) 130. The CN 130 may be any network that is suitable for carrying, preferably downstream and upstream, broadband multimedia signals, such as audio/video signals, IP signals, telephony signals, or data signals to name but a few. The CN 130 may be, for example, a hybrid fiber/coax (HFC) network, a fiber-to-the-home (FTTH) network, a satellite network, or a fixed wireless network (e.g., MMDS), among others.

The HE 120 may include one or more server devices for providing broadband signals, such as video, audio, and/or data signals, to a primary device 140 via the CN 130. The HE 120 and the primary device 140 cooperate to provide a user with a variety of services. The services may include, for example, analog or digital broadcast television services and channels, video-on-demand (VOD) services, and/or pay-perview (PPV) services, among others. Each broadcast television channel typically provides a sequence of television presentations corresponding to a television station (e.g., ABC, NBC, CBS, or FNN) and is typically identified by a channel number (e.g., channel 2, channel 3, channel 4) that is available to a user at all times. Additionally, PPV services are typically transmitted to the primary device 140 at all times, but can only be viewed on the primary device 140 as provisioned. On the other hand, the primary device 140 typically requests a VOD service and, subsequently, the HE 120 transmits the presentation downstream to the primary device 140.

The NMS can include a router, but as shown in FIG. 1, the NMS 110 includes a splitter/isolator module (SIM) 160 that receives downstream broadband signals from the HE 120 and subsequently provides the downstream signals to the primary device 140 or to both the primary device 140 and any one or all of the remote devices 150-1 to 150-n depending on the implementation. Upon command from at least one of the remote devices 150-1 to 150-n, the primary device 140 may also forward selected real-time downstream signals and/or stored content signals to the requesting remote device 150-1, for example, via the SIM 160. The remote device 150-1 communicates with the primary device 140 by sending reverse control/command signals via coaxial cable requesting stored presentations, real-time signals, or the network guide. Other wired mediums, such as telephone lines or data cables, may be used so long as the transport format accommodates the desired transmission medium. The remote devices 150-1 to 150-n have access to all of the primary device 140's hardware and software functionality, along with receiving downstream signals directly from the headend via the SIM 160. Therefore, the remote devices 150-1 to 150-n may have limited resources, such as not including a storage device in order to record and store a presentation, thereby decreasing the overall costs to the service provider and the subscriber while offering advanced services to all of the remote devices 150-1 to 150-n that are networked to the primary device 140.

Furthermore, the primary device 140 may also directly provide signals, such as analog and digital channels, stored presentations, or the network guide to name but a few, to a coupled display device 180, which may be, for example, a television, computer, or PDA (personal digital assistant), among others. The primary device 140 may transmit signals to and receive control signals from the display device 180 via wireless devices (e.g., RF or IR devices) or a wired medium (e.g., coaxial cable, power lines, or telephone lines). It will also be appreciated that the primary device 140 may be incorporated in the display device 180.

The primary device 140, in accordance with one embodiment of the present invention, includes a processor, a tuner system, a storage device, a modulator, and a remote device communications receiver. Each of the remote devices, such as the remote device 150-1, may be identical to the primary device 140 but share the storage device contents of the primary device 140. Alternatively, the remote device 150-1 may be a simplified or conventional version of the primary device 140. A processor and a tuner system, which may be a simplified processor and only one tuner, may be included to extract channels from the received downstream broadband signals. Additionally, decryptors and decoders may be included to decode encoded signals for proper processing and display. Preferably, the remote device 150-1 includes a user input receiver, such as an IR receiver or an RF receiver that receives signals from a remote control, such as an IR remote control or an RF remote control. The remote control is not required and any user input device could be incorporated in the remote device 150-1.

In the event that the remote device 150-1, upon user input, requests a presentation, a reverse command signal is transmitted from the remote device 150-1 to the primary device 140 via the SIM 160. The remote device command receiver receives and demodulates the command signal according to its transmission method, such as frequency-shift keying (FSK) or on-off keying (OOK) transmission. The processor subsequently receives the demodulated command signals indicative of the requested action (e.g., requesting a presentation) and in accordance therewith instructs the tuner to tune to, for example, a channel carrying a real-time downstream signal, or the processor may retrieve a stored presentation from the storage device. The presentation's content signals are then provided to the modulator, which modulates the selected presentation prior to forwarding to the SIM 160. A preferred embodiment of the present invention uses a quadrature amplitude modulation (QAM) modulator, which may be used for effectively transmitting signals over coaxial cable in a cable television environment.

The presentations stored in the storage device of the primary device 140 include program identifiers (PIDs), which may be indexed and stored as a table in the primary device's memory. The remote devices 150-1 to 150-n may watch a single stored presentation by remapping the PID value of the stored program to a different PID value prior to modulation. PID remapping comprises replacing the PID in the header of the packet with a different value. PID remapping can be accomplished with a variety of methods, such as, for example, by using a table, an algorithm, or hardware. In this manner, the single stored program basically remains in the storage device of the primary device 140, while the transmitted presentation is a version of the stored presentation having a remapped PID value.

If two remote devices request the same presentation, a version of the presentation on the primary device 140 is sent to each requesting remote device 150-1 to 150-n. Each version will have a different PID value. The processor in the primary device 140 alerts the requesting remote device, such as remote device 150-2, of the expected remapped PID value in order to ensure the remote device 150-2 extracts the requested presentation from a signal sent by the primary device 140.

To play a DVD movie from the primary device 140 to one or more remote devices 150-1 to 150-n simultaneously or at varying times, a portion or all of the content from the DVD must first be copied to the hard drive of the primary device 140. The primary device 140 transcodes the desired content of the DVD from an MPEG program stream to an MPEG transport stream and creates a PID value for the transport stream. With the presentation in an MPEG transport stream, trick play features are available while viewing the presentation. Also, the DVD presentation may have an encryption scheme, such as CSS encryption, which must be decrypted and then encrypted with a second encryption scheme particular to the NMS 110, such as the multi-room 3DES encryption, to ensure that the content remains secure over the NMS 110. The primary device 140 contacts the HE 120 to provide security and viewer data collection after copying the presentation to the primary device 140's hard drive. The HE 120 may also be contacted by the primary device 140 prior to DVD playback to secure permissions, pay royalties, etc., as negotiated by the cable operator and the DVD copyright holder. There is sufficient time to do this during the copying and transcoding processes. The HE 120 could also download additional material relevant to the movie and populate the VOD menu with similar or related movies.

Figure 2:
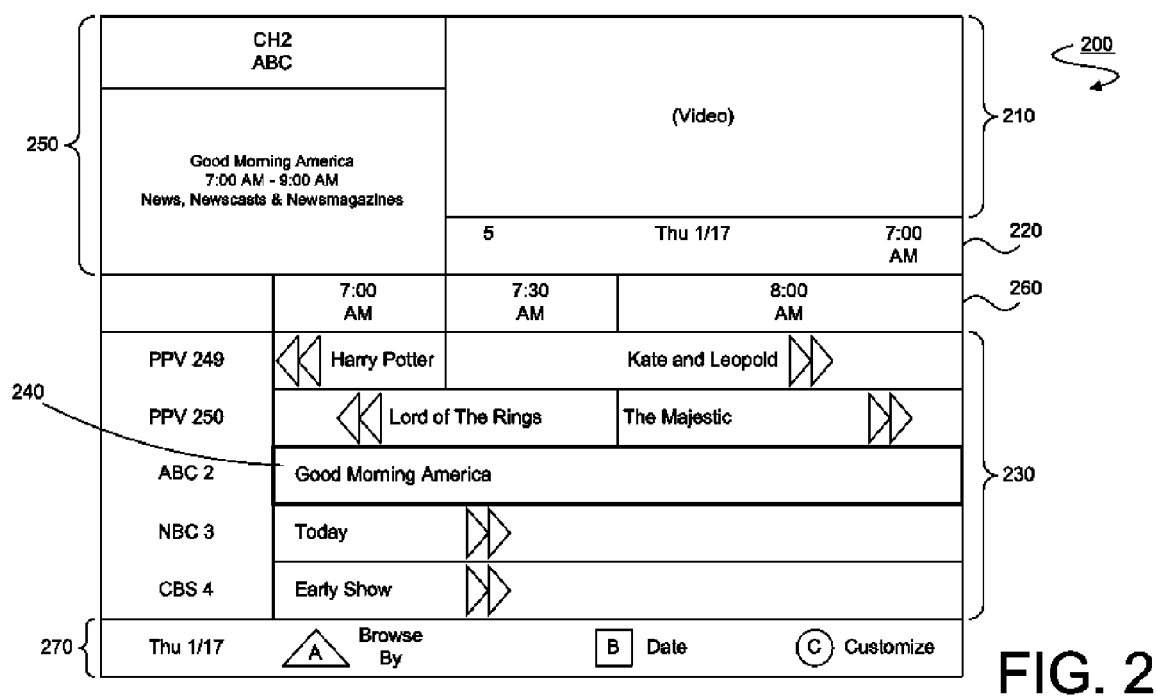
FIG. 2 illustrates a non-limiting example of one embodiment of an interactive program guide (IPG), which is suitable for use in the NMS of FIG. 1.

FIG. 2 illustrates a non-limiting example of an interactive program guide (IPG) screen 200 that is suitable for use in the NMS 110 of FIG. 1. The IPG screen 200 may be presented in response to user input that may be provided via the activation of a guide key on the remote control. In the top right of the IPG screen 200, video corresponding to the channel to which the primary device 140 is currently tuned may be displayed in the video area 210 for scaled video. Immediately below the video area 210 is an information banner 220 for displaying the channel number corresponding to the channel to which the primary device 140 is currently tuned, the current day and date, and the current time.

In one embodiment, arrow buttons on the remote control can be used to scroll through a main presentation listing 230 and to highlight a desired presentation 240. The top left portion of the IPG screen 200 is a detailed focus area 250 that includes detailed information for a currently highlighted presentation 240. The detailed focus area 250 may include channel number, channel description, presentation name, duration of the presentation, and/or any episode information or rating. As a user scrolls in time across a boundary 260, the day and date indications displayed in various areas are updated. The area 270 at the bottom of the IPG screen 200 also indicates the current day for which presentation listing data is being displayed as well as information about the current functions of the optional "A," "B," and "C" keys that may be on the remote controls and are used in conjunction with the IPG. Further information regarding an interactive program guide can be found in copending U.S. patent application Ser. No. 10/212,017 filed on Aug. 2, 2002, the disclosure and teachings of which are hereby incorporated by reference.

FIG. 3 illustrates an IPG 300 including functionality listings, such as a personal video recording (PVR) listing 310 and a network guide listing (NG) 320, and a channel listing for a DVD 330. Highlighting and selecting a movie 340 accesses for example, Star Wars, which has been recorded from a DVD to the hard drive of the primary device 140 to begin playing the movie 340. Also shown as a presentation under the DVD channel listing 330 at a later time is the menu and bonus footage 350. By offering both the movie 340 and the menu and bonus footage 350 as options for the DVD channel listing 330, the user can quickly locate the desired material.

Figure 5:
FIG. 5 illustrates a non-limiting example of a recorded programs list screen that may be presented to a remote device via the NMS of FIG. 1.

FIG. 4 illustrates an alternative embodiment of an IPG 400 including functionality listings, such as the DVD channel listing 330 and a separate DVD menu listing 410. Unlike the previous embodiment shown in FIG. 3, which shows the movie 340 and the menu and bonus footage 350 appearing on the same channel 330 at different times, this embodiment displays the movie 340 and the menu and bonus footage 350 as different channels 330 and 410, respectively. This allows the user to quickly begin playing the movie 340 or to choose to view the menu and bonus footage 350 that normally accompanies a DVD. Highlighting and selecting the PVR listing 310 accesses a recorded programs list screen 500 as shown in FIG. 5. Alternatively, the user can select the channel number using number keypads on the remote control, such as entering numbers 310 or 330.

Still referring to FIG. 5, the interactive recorded programs list screen 500 shows a portion of a recorded programs list 510 that may be presented to the remote devices 150-1 to 150-n via the NMS 110 of FIG. 1. The recorded programs list screen 500 displays a recorded programs list 510 that includes all the recorded programs along with, for example, the title, the recording date and time, and the length of the program. If a movie from a DVD has been copied and saved to the hard drive of the primary device 140, the movie can appear on the recorded programs list screen 500 in the recorded programs list 510, as for example Star Wars 520. A separate entry 530 on the recorded programs list 510 can appear for the menu and bonus footage corresponding to the movie 520. A presentation in the highlighted program line 520 can typically be selected for viewing by pressing a select button or a play button on a remote control. When a remote device 150-1, for example, requests a list of the recorded programs, the processor accesses the recorded programs list 510, which is stored in memory, and subsequently forwards the content signals indicative of the recorded programs list 510 to the modulator for modulation and transmission to the requesting remote device 150-1.

For example, a presentation 520 entitled Star Wars, from a DVD, was saved to the hard drive of the primary device 140 on Wednesday, October 11 and is three hours in length. After the user selects the presentation 520, the remote device 150-1 sends a reverse command signal that is indicative of the selected presentation (i.e., Star Wars) to the remote command receiver via the SIM 160. The processor extracts Star Wars from the storage device using an identifier. The presentation 520 is subsequently modulated and transmitted to the SIM 160 for delivery to the remote device 150-1. The requesting remote device 150-1 tunes to the modulator frequency and waits for the response (i.e., the presentation 520 entitled Star Wars).

Figure 6:
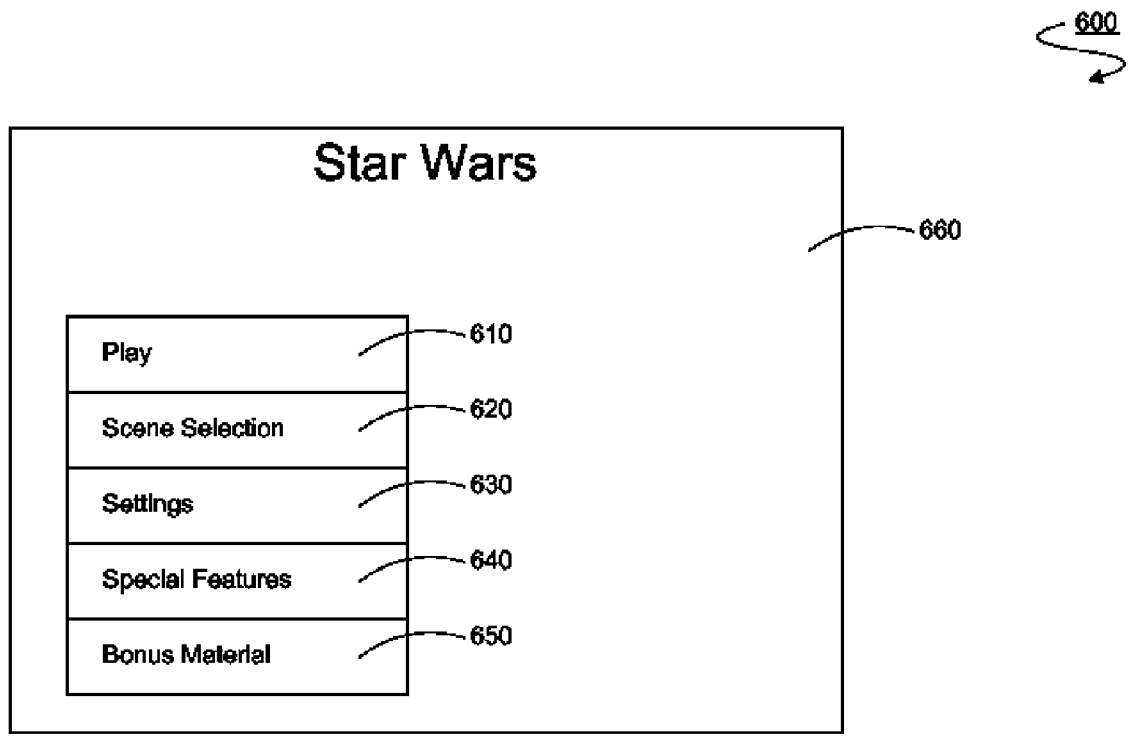
FIG. 6 illustrates a non-limiting example of a DVD menu screen.

FIG. 6 illustrates one embodiment of a root menu 600 typical on store bought, or prerecorded, professional DVDs. Options within the root menu 600 typically include play 610, scene selections 620, settings 630, and special features 640. The menu 600 can contain an option for bonus material 650, which could be inserted material such as, contests, seasonal promotions, commercials, previews, movie prequels/sequels, or other additional content or inserted material. The primary device 140 will contact the HE 120 to determine what relevant material has been previously downloaded and stored at the HE 120 and can be inserted into the DVD menu 600. Alternatively, the inserted material could be downloaded and stored elsewhere such as on a server distributed in the network or at one of the set-top boxes in the NMS 110. The DVD could also have PC readable files, such as HTML documents or executable files that pertain to the tuned presentation. For example, for the movie Star Wars, background information on the characters and games associated with the movie could be included. The existing menu screen 600 could also be altered to have added or replaced material such as a commercial, logo, or a picture of a product as a background 660.

Advertising opportunities are created by altering the movie on the primary device 140. The movie has been indexed into chapters for the scene selection option, and ads or commercials could easily be inserted to correspond with the beginning or end of one or more chapters. The commercials could have been previously downloaded and saved to the primary device 140, one of the remote devices 150-1 to 150-n, or the HE 120. Depending on user preferences or the DVD being played, corresponding commercials could be chosen and displayed. For example, during the presentation Star Wars, the inserted commercials could be for Star Wars merchandise. Therefore, commercials to be inserted could be selected based upon the original content of the DVD. The same commercials could be played on all devices 140 and 150-1 to 150-n or the commercials could be tailored to the user of each particular device based upon user preferences or parental control settings. For example, the chosen commercials could be different for each device 140 or 150-1 to 150-n playing the movie from the DVD.

It should be emphasized that the above-described embodiments of the invention are merely possible examples, among others, of the implementations, setting forth a clear understanding of the principles of the invention. Many variations and modifications may be made to the above-described embodiments of the invention without departing substantially from the principles of the invention. All such modifications and variations are intended to be included herein within the scope of the disclosure and invention and protected by the following claims. In addition, the scope of the invention includes embodying the functionality of the embodiments of the invention in logic embodied in hardware and/or software-configured mediums.

What is claimed is:

1. A method for transmitting a prerecorded presentation recorded from a DVD over a networked multi-room system (NMS), said method comprising the steps of:
    storing at least a portion of a prerecorded presentation to a storage device of a set-top box;
    transmitting at least a portion of said stored presentation from said storage device to one or more other set-top boxes; and
    altering a menu of said stored presentation with inserted material.

2. A method for transmitting a prerecorded presentation recorded from a DVD over a networked multi-room system (NMS), said method comprising the steps of:
    storing at least a portion of a prerecorded presentation to a storage device of a set-top box;
    transmitting at least a portion of said stored presentation from said storage device to one or more other set-top boxes; and
    inserting material into said stored presentation.

3. The method of claim 2, further comprising the step of transcrypting from a first encryption scheme to a second encryption scheme suitable for said NMS.

4. The method of claim 1, wherein said menu altering step comprises inserting a logo as said inserted material.

5. The method of claim 1, wherein said menu altering step comprises inserting said material that depicts a product.

6. The method of claim 1, wherein said menu altering step comprises inserting a preview as said inserted material.

7. The method of claim 1, wherein said menu altering step comprises inserting a computer readable file as said inserted material.

8. The method of claim 2, further comprising the step of transcoding said prerecorded presentation stored on said storage device from an MPEG program stream to an MPEG transport stream which is stored on said storage device.

9. The method of claim 2, further comprising the step of selecting additional material based upon user preferences for inserting into said stored presentation.

10. The method of claim 2, further comprising the step of selecting additional material based upon said stored presentation.

11. The method of claim 2, wherein said inserting step comprises inserting material into a menu of said stored presentation.

12. The method of claim 11, further comprising the step of selecting additional material based upon user preferences for inserting into said menu of said stored presentation.

13. The method of claim 11, further comprising the step of selecting additional material based upon said stored presentation.

14. A method for transmitting a prerecorded presentation recorded from a DVD over a networked multi-room system (NMS), said method comprising the steps of:
    storing at least a portion of a prerecorded presentation to a storage device of a set-top box; and
    transmitting at least a portion of said stored presentation from said storage device to one or more other set-top boxes, wherein said transmitting step comprises transmitting at least a portion of a first version of said stored presentation to a first set-top box and at least a portion of a second version of said stored presentation to a second set-top box.

15. The method of claim 14, further comprising the step of PID remapping at least said portion of said second version of said stored presentation to said second set-top box.

16. The method of claim 14, wherein said transmitting step further comprises transmitting at least said portions of said versions simultaneously.

17. The method of claim 14, wherein said transmitting step further comprises commencing the transmission of at least portions of said first and second versions of said presentation at different times.

18. The method of claim 17, said transmitting step further comprises transmitting said portions of said first and second versions of said presentation concurrently.

19. The method of claim 14, wherein said transmitting step further comprises commencing the transmission of said first and second versions of said stored presentation at different times.

20. The method of claim 14, further comprising the step of inserting material into said first version and inserting other material into said second version.

21. The method of claim 20, further comprising the step of selecting said materials for insertion based on user preferences of said first and second set-top boxes.

22. The method of claim 20, further comprising the step of selecting said materials for insertion based on parental controls established for said first and second set-top boxes.

23. The method of claim 14, further comprising the step of differentiating said first and second versions of said stored presentation based upon program identifiers.

24. The method of claim 2, further comprising the step of retaining at least said portion of said prerecorded presentation without altering said at least portion of said prerecorded presentation.

* * * * *